April 15, 1947. A. H. EMERY 2,419,061

PRESSURE OPERATED ELECTRIC STRAIN GAGE

Filed Sept. 22, 1944

INVENTOR
Albert H Emery
BY
ATTORNEY

Patented Apr. 15, 1947

2,419,061

UNITED STATES PATENT OFFICE 2,419,061

PRESSURE OPERATED ELECTRIC STRAIN GAGE

Albert H. Emery, Stamford, Conn., assignor to The Baldwin Locomotive Works, a corporation of Pennsylvania Application September 22, 1944, Serial No. 555,356

3 Claims. (Cl. 201—48)

This invention relates generally to fluid pressure measuring apparatus and particularly to the type employing a strain gage as the pressure measuring means.

It is an object of my invention to provide an improved fluid pressure measuring device that is relatively simple and economical in construction, operation and maintenance and is compact, rugged and thoroughly reliable and stable in its accuracy, sensitivity and responsiveness.

In the specific embodiment of the invention, I accomplish the foregoing as well as other objects which will be apparent to those skilled in the art by employing a U-shaped member formed preferably of wide, thin material with a fluid pressure actuated expansible member preferably a "Sylphon" bellows disposed between the opposed sides of the U-shaped member, and then I provide a strain gage located at the cross portion of the U-member. This arrangement is particularly adapted for use of a bonded wire resistance type strain gage which may be easily cemented to the curved surface of said cross portion. This gage is well-known and is disclosed in Simmons Patent 2,292,549.

Other objects and advantages will be more apparent to those skilled in the art from the following description of the accompanying drawing in which.

Figure 1:
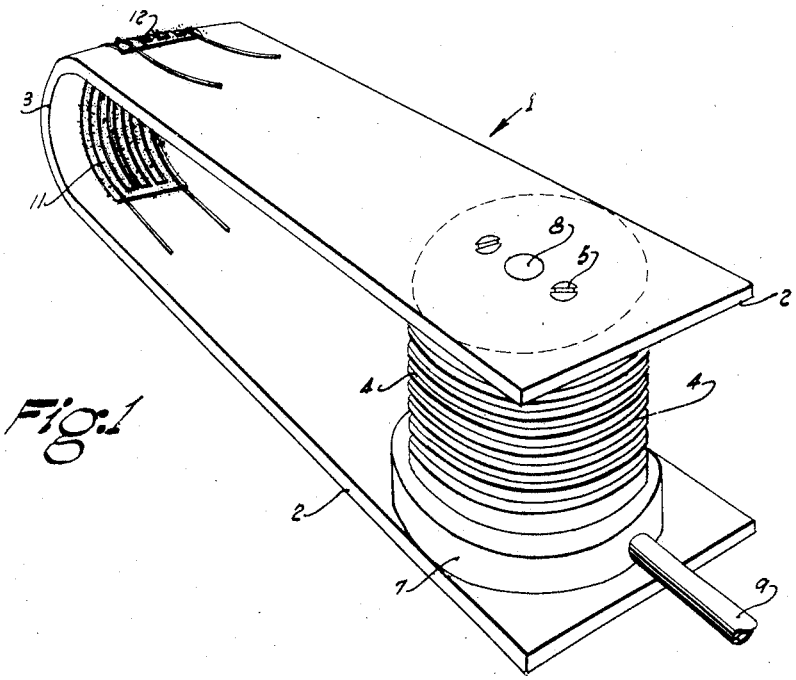
Fig. 1 is a perspective of my improved device.
Figure 2:
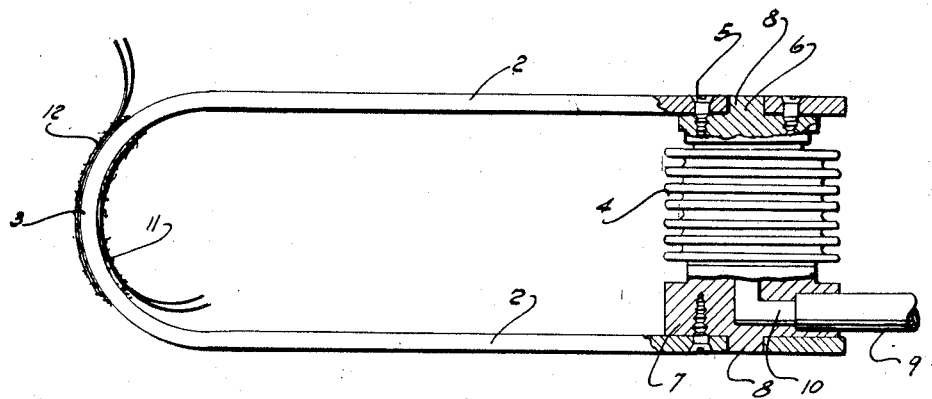
Fig. 2 is a side elevation with certain parts broken away to show details of construction.

As disclosed herein, I provide a U-shaped member generally indicated at 1 formed preferably of relatively wide, thin material, preferably steel, arranged with relatively long parallel leg portions 2 and a preferably semi-circular transverse portion 3. The length of the parallel legs for a given width and thickness of metal may be varied in accordance with the magnitude of pressure to be measured or the sensitivity desired. To actuate this member an expansible fluid pressure device preferably in the form of "Sylphon" bellows 4 is disposed between the end portions of the parallel legs and suitably secured thereto by screws 5 and Sylphon end plates 6 and 7. If desired, these end plates may have small centering bosses 8 disposed in suitable openings in the U-member. Fluid pressure to be measured is supplied to the "Sylphon" bellows by pipe 9 and passage 10 formed in the lower member 7. A strain gage 11 of the above-mentioned bonded resistance wire type is cemented preferably to the curved surface of the transverse portion 3 and the resistance wires extended in a direction lengthwise of the U-member as a whole. To obtain maximum sensitivity, a second gage 12 may, if desired, be formed on the outer surface of the U-member and the two gages connected in the arms of a Wheatstone bridge in a manner well-known in the art so that their action is cumulative, although under certain circumstances, a single gage may be employed if necessary.

In operation, fluid pressure to be measured is admitted to the "Sylphon" bellows which moves the leg portions apart to effect a change in strain of the transverse portion 3 whereby the strain gage 11 or 12 will respond to such change of strain. This change of strain will be an indication of the degree of fluid pressure in the bellows and will vary with changes in pressure. My improved arrangement is readily adapted to any desired degree of sensitivity merely by varying the length of the parallel legs 2 or by shifting the "Sylphon" bellows inwardly to successive positions if desired depending upon whether a standard size U-member is to be employed. Varying sensitivity may also be obtained by employing material of different thickness, but in any of the foregoing cases the relatively wide nature of the U-member is preferably employed as it insures a higher degree of lateral stability for steadying the bellows in directions transversely of its axis without restricting its freedom of action in an axial direction. The device as shown presents an extremely compact, self-contained and highly rugged fluid pressure measuring instrument which is particularly advantageous in view of certain elements, such as the "Sylphon" bellows and strain gage, being of a relatively delicate nature from a machinery standpoint. The highly self-contained and yet compact arrangement of elements provides a very effective article of manufacture besides its various desirable functional characteristics.

It will of course be understood that various changes in details of construction and arrangements of parts may be made by those skilled in the art without departing from the spirit of the invention as set forth in the appended claims.

I claim:

1. A fluid pressure measuring device comprising a substantially U-shaped flexible member having opposed leg portions connected by a substantially semicircular transverse portion, a fluid pressure expansible device disposed between said opposed leg portions and engageable therewith to subject the U-member to strain during expansion or contraction of the expansible member, and strain responsive means comprising a bonded resistance wire gage extending around the surface of said transverse portion so as to be responsive to strains induced therein upon relative movement between the opposed legs by fluid pressure in the bellows.

2. A fluid pressure measuring device comprising an element having opposed portions connected by a flexible portion adapted to be variably strained when said opposed portions are relatively moved toward or away from each other, a strain gage secured to said flexible portion, a fluid controlled expansible device having relatively movable parts one of which is connected to one of said opposed portions, and means for connecting the other of said parts to the other of said opposed portions whereby all forces are self-contained within said element so that expansion or contraction of said expansible device causes the flexible member to be strained and accordingly cause the strain gage to be operated.

3. The combination set forth in claim 2 further characterized in that said flexible portion has a curved surface and said strain gage comprises an electrical conductor whose resistance varies with strain bonded throughout its effective length to said curved surface of the flexible member.

ALBERT H. EMERY.

REFERENCES CITED

The following references are of record in the file of this patent:

UNITED STATES PATENTS

| Number | Name | Date |
| --- | --- | --- |
| 2,059,549 | Carlson | Nov. 3, 1936 |
| 2,336,500 | Osterberg | Dec. 14, 1943 |
| 1,612,344 | Arnison | Dec. 28, 1926 |
| 1,873,284 | Carbonara | Aug. 23, 1932 |
| 2,223,640 | Rineer | Dec. 3, 1940 |
| 2,224,024 | Smith | Dec. 3, 1940 |
| 2,316,975 | Ruge | Apr. 20, 1943 |